United States Patent [19]

Goodstine et al.

[11] 4,429,471
[45] Feb. 7, 1984

[54] FLUIDIZED BED AIR DISTRIBUTOR

[75] Inventors: Stephen L. Goodstine, Windsor; Glen D. Jukkola, Glastonbury, both of Conn.

[73] Assignee: Conoco Inc., Wilmington, Del.

[21] Appl. No.: 329,545

[22] Filed: Dec. 10, 1981

[51] Int. Cl.³ .......................... F26B 3/08; F26B 17/10
[52] U.S. Cl. ........................................... 34/10; 34/34; 34/57 B; 239/557; 239/600
[58] Field of Search ............... 239/590, 600, 548, 557; 34/10, 57 R, 57 A, 57 B, 34; 432/15, 58

[56] References Cited

U.S. PATENT DOCUMENTS

| | | |
|---|---|---|
| 2,841,476 | 9/1958 | Dalton . |
| 2,901,332 | 8/1959 | Randall . |
| 3,672,577 | 6/1972 | Kramer . |
| 3,708,887 | 1/1973 | Erisman ............................ 34/57 A |
| 3,746,516 | 7/1973 | Michaud . |
| 4,073,064 | 2/1978 | Steever et al. . |
| 4,292,023 | 9/1981 | De Feo et al. ..................... 34/57 A |

*Primary Examiner*—Larry I. Schwartz
*Attorney, Agent, or Firm*—Dale Lovercheck; William A. Mikesell, Jr.

[57] ABSTRACT

Fluidized bed apparatus comprising a fluidized chamber having a grid plate below said chamber, a feed gas channel below said grid plate, and a fluidized bed gas distributor, said fluidized bed gas distributor comprising a nipple,
a cap,
and a bushing,
wherein said cap is provided with at least one gas distribution passage, and said nipple includes a central nipple passage and said bushing includes a central bushing passage,
said cap being attached to a first end of said nipple said bushing being attached to a second end of said nipple.

17 Claims, 2 Drawing Figures

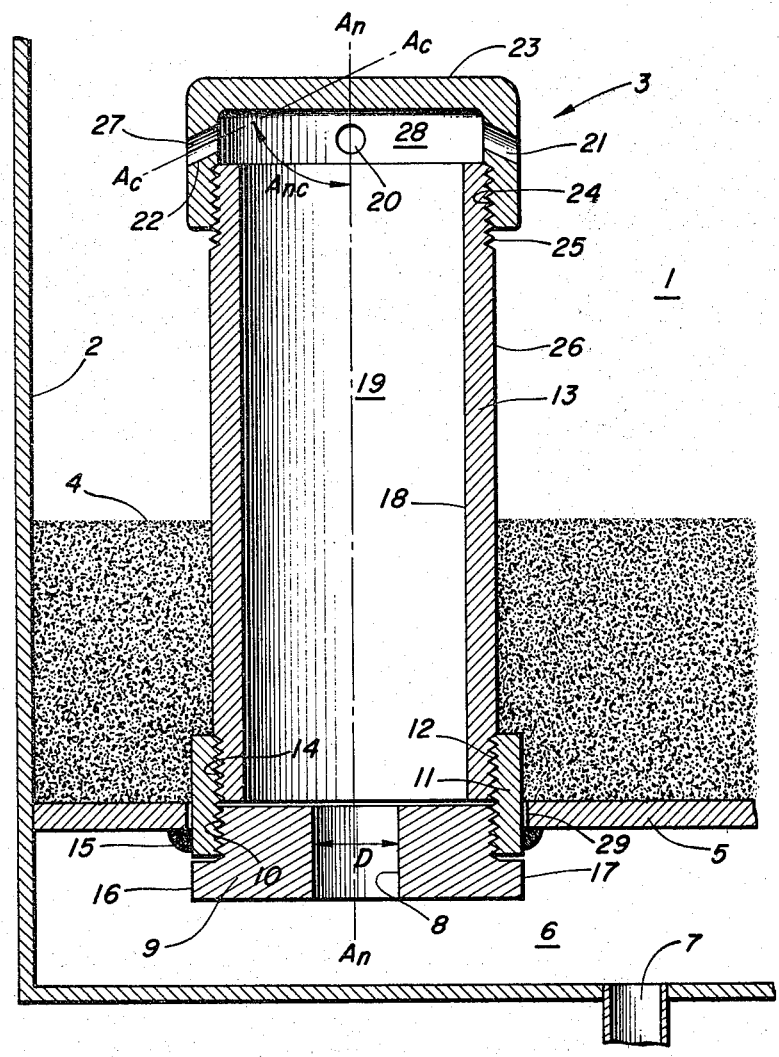
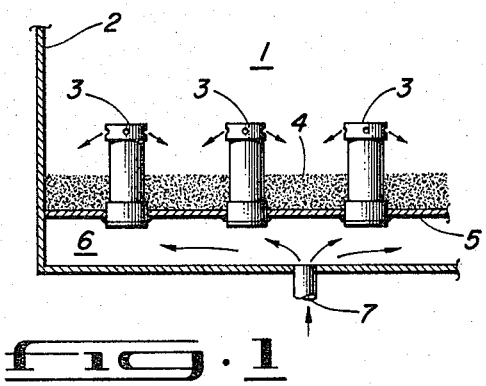

FLUIDIZED BED AIR DISTRIBUTOR

BACKGROUND OF THE INVENTION

Kramer in U.S. Pat. No. 3,672,577 discloses a grid plate assembly for a fluid bed reactor including an apertured grid plate having nozzle elements in the apertures. The apertures and nozzle elements are structured to prevent dislodgment of the nozzle elements from the grid plate during use of the assembly and yet permit ready removable of the nozzle elements from the apertures when desired.

Dalton in U.S. Pat. No. 2,841,476 discloses a gas liquid contacting apparatus having a chamber, a horizontally disposed apertured plate in the chamber, a mass of finely divided solids supported on the plate and adapted to subside thereon when non-fluidized, and means of passing fluidizing gases through the apertures to fluidize the solids and gas introduction means adapted to limit passage of the solids into the apertures when the solids are subsided. The gas introduction means having an insert in each aperture. The insert having a tubular hollow member extending upwardly from the aperture. The member being open at the bottom and closed at the top and having sidewalls of substantial thickness.

SUMMARY OF THE INVENTION

Fluidized bed apparatus having a fluidized chamber having a grid plate below the chamber, a feed gas channel below the grid plate, and a fluidized bed gas distributor, the fluidized bed gas distributor having
a nipple,
a cap,
and a bushing, wherein the cap is provided with at least one gas distribution passage, and the nipple includes a central nipple passage and the bushing includes a central bushing passage,
the cap being attached to a first end of the nipple the bushing being attached to a second end of the nipple.

BRIEF DISCUSSION OF THE FIGURES

FIG. 1 is a cross-sectional view of a fluidized bed apparatus in accordance with the present invention.

FIG. 2 is a cross-sectional view of a distributor apparatus in accordance with the present invention.

DETAILED DISCUSSION OF THE INVENTION

The invention relates to the distribution of gases in a fluidized bed apparatus. A preferred embodiment of the invention is shown in FIG. 1. The fluidized bed chamber 1 is surrounded by the fluidized bed chamber wall 2 with gas distributor 3 supported by the grid plate 5. The upper surface of unfluidized bed material is shown at 4.

Feed gas channel 6 is provided gas from feed gas inlet 7.

In FIG. 2 a gas distributor 3 which is preferably constructed of metal is shown having a central bushing passage 8 in bushing 9. The upper outer bushing threads 10 attach the bushing 9 to the coupling 11. Inner coupling threads 12 attach the coupling 12 to the nipple 13. Lower outer nipple threads 14 attach the nipple 13 to the coupling 11. The coupling 11 is attached to the grid plate 5 by grid plate coupling weld 15.

The bushing 9 is provided with a bushing flange 16 which preferably contacts the coupling 11. The lower outer bushing wall 17 of the bushing 9 is in the feed gas channel 6. Feed gas to be distributed by the gas distributor 3 passes from the feed gas inlet 7 to the feed gas channel 6 into the central bushing passage 8. From the central bushing passage 8 the gas passes into the central nipple passage 19. The central nipple passage 19 is defined by the nipple inner wall 18. From the central nipple passage 19, the gas passes into the gas distributor cap passage inner orifice 20 and through the gas distributor cap passage 27 which is defined by the gas distributor cap passage wall 22. The gas passes out of the gas distributor cap passage outer orifice 21 and into the fluidized bed chamber 1 where it fluidizes the material in the fluidized bed. The cap 23 is provided with inner cap threads 24 which attach the cap 23 to the nipple 13. The nipple 13 is provided with upper outer nipple threads 25 on the nipple outer wall 26. The inner cap threads 24 thread onto the upper outer nipple threads 25 to attach the cap 23 to the nipple 13.

The bushing 9 is adapted to be readily removable. The advantage of having a readily removable bushing 9 is the flexibility provided thereby in the control of the pressure drop across the gas distributor 3 by varying the diameter D of the central bushing passage 8. When a higher pressure drop is desired across the gas distributor 3, the bushing 9 is removed and a bushing with a smaller diameter D is substituted therefor. Similarly when a lower pressure drop is desired across the gas distributor 3, a bushing is inserted with a larger diameter D in the central bushing passage 8. By providing a series of bushings with slightly different central bushing passage diameters, precise control over the pressure drop across the gas distributor is attained.

The cap 23 is removable by unthreading the cap 23 from the nipple 13. The gas distribution cap passages 27 have a central axis $A_c$. The central nipple passage 19 has an axis $A_n$. The axes $A_c$ and $A_n$ of the gas distributor cap passage and the central nipple passage respectively meet at an angle $A_{nc}$. Most preferably the angle $A_{nc}$ is less than 90°. When the angle $A_{nc}$ is less than 90°, the gas distributor cap passage slopes downwardly from the cap chamber 28. Thus the gas distributor cap passage inner orifice 20 would be higher than the gas distributor cap passage outer orifice 21 when the angle $A_{nc}$ is less than 90°. The advantage of having the gas distributor cap passage sloping downwardly from the cap chamber is that particles from the fluidized bed would be less likely to collect in the gas distributor cap passage 27.

The pressure drop through the cap itself should be just enough to insure even distribution of gas through the gas distribution cap passages 27. The balance of the pressure drop across the gas distributor 3 occurs across the orifice of the bushing 9. The advantage of this system is that the pressure drop through the gas distributor 3 can be changed simply by removing the bushing from under the grid plate and threading in another bushing with the required orifice size. With conventional bubble cap design, the caps would have to be completely replaced for a pressure drop modification. The cost of replacing them would be prohibitive. A change in required plate pressure drop could result in changes in design conditions, or from uneven gas distribution at the originally designed pressure drop.

A further advantage of the present invention is the ease of fabrication. After drilling the grid plate coupling orifices 29 and welding the couplings 11 to the grid plate 5 the gas distributors 3 can be threaded into the coupling 11 in a few seconds.

The non-fluidized bed material below the cap 23 protects the plate from high temperatures.

While the present invention has been disclosed by references to certain of its preferred embodiments, it is pointed out that the embodiments set forth are illustrative rather than limiting in nature and that many variations and modifications are possible within the scope of the present invention. Many such variations and modifications may be considered obvious or desirable to those skilled in the art based upon a review of the foregoing description of preferred embodiments.

Having thus described the present invention, we claim:

1. A gas distributor comprising:
   a nipple,
   a cap,
   and a bushing, wherein said cap is provided with at least one gas distribution passage, and said nipple includes a central nipple passage and said bushing includes a central bushing passage,
   said cap being attached to a first end of said nipple said bushing being attached to a second end of said nipple
   said nipple being cylindrical, said central nipple passage being cylindrical,
   said bushing being cylindrical said central bushing passage being cylindrical, said central nipple passage and said central bushing passage being connected in fluid flow communication, the diameter of said central bushing passage being smaller than the diameter of said central nipple passage, whereby the flow of fluid into said central nipple passage is restricted by said smaller diameter of said central bushing passage.

2. The gas distribution apparatus of claim 1 wherein said gas distribution apparatus further comprises a coupling, said nipple being attached to said coupling, and said bushing being attached to said coupling.

3. The gas distribution apparatus of claim 2 wherein said coupling is connected to a fluidized bed grid plate,
   said coupling being cylindrical and threaded along the inner wall thereof,
   said nipple being threaded at said second end, said nipple threads engaging said coupling threads, whereby said nipple is connected to said grid plate,
   said bushing being threaded along at least a portion of the outer wall thereof, said bushing threads engaging said coupling threads, whereby said bushing is connected to said grid plate.

4. The apparatus of claim 1 wherein said cap is provided with a plurality of cap passages.

5. The apparatus of claim 4 wherein said cap passages have a central axis which extends across a central axis of said nipple at an angle of less than 90°.

6. In a fluidized bed apparatus having a fluidized chamber with fluidized material therein and a grid plate at the bottom of said fluidized chamber and a gas distribution passage into said fluidized chamber, the improvement comprising,
   providing a fluidized bed distributor wherein said fluidized bed distributor comprises
   a nipple,
   a cap,
   and a bushing, wherein said cap is provided with at least one gas distribution passage, and said nipple includes a central nipple passage and said bushing includes a central bushing passage,
   said cap being attached to a first end of said nipple said bushing being attached to a second end of said nipple
   said nipple being cylindrical, said central nipple passage being cylindrical,
   said bushing being cylindrical said central bushing passage being cylindrical, said central nipple passage and said central bushing passage being connected in fluid flow communication, the diameter of said central bushing passage being smaller than the diameter of said central nipple passage, whereby the flow of fluid into said central nipple passage is restricted by said smaller diameter of said central bushing passage
   said bushing being adapted to be readily separable from said nipple from below said grid plate said nipple being attached to said grid plate.

7. The gas distribution apparatus of claim 6 wherein said gas distribution apparatus further comprises a coupling, said nipple being attached to said coupling, and said bushing being attached to said coupling.

8. The gas distributor apparatus of claim 7 wherein said coupling is connected to a fluidized bed grid plate,
   said coupling being cylindrical and threaded along the inner wall thereof,
   said nipple being threaded at said second end, said nipple threads engaging said coupling threads, whereby said nipple is connected to said grid plate,
   said bushing being threaded along at least a portion of the outer wall thereof, said bushing threads engaging said coupling threads, whereby said bushing is connected to said grid plate.

9. The apparatus of claim 6 wherein said cap is provided with a plurality of cap passages.

10. The apparatus of claim 6 wherein said cap passages have a central axis which extends across a central axis of said nipple at an angle less than 90°.

11. Fluidized bed apparatus comprising a fluidized chamber having a grid plate below said chamber, a feed gas channel below said grid plate, and a fluidized bed gas distributor,
    said fluidized bed gas distributor comprising
    a nipple,
    a cap,
    and a bushing, wherein said cap is profided with at least one gas distribution passage, and said nipple includes a central nipple passage and said bushing includes a central bushing passage,
    said cap being attached to a first end of said nipple said bushing being attached to a second end of said nipple
    said nipple being cylindrical, said central nipple passage being cylindrical,
    said bushing being cylindrical said central bushing passage being cylindrical, said central nipple passage and said central bushing passage being connected in fluid flow communication, the diameter of said central bushing passage being smaller than the diameter of said central nipple passage, whereby the flow of fluid into said central nipple passage is restricted by said smaller diameter of said central bushing passage
    said bushing being adapted to be readily separable from said nipple from below said grid plate said nipple being attached to said grid plate.

12. The gas distribution apparatus of claim 1 wherein said gas distribution apparatus further comprises a coupling, said nipple being attached to said coupling, and said bushing being attached to said coupling.

13. The gas distributor apparatus of claim 12 wherein said coupling is connected to a fluidized bed grid plate,
    said coupling being cylindrical and threaded along the inner wall thereof,
    said nipple being threaded at said second end, said nipple threads engaging said coupling threads, whereby said nipple is connected to said grid plate,
    said bushing being threaded along at least a portion of the outer wall thereof, said bushing threads engaging said coupling threads, whereby said bushing is connected to said grid plate.

14. The apparatus of claim 13 wherein said bushing comprises flange, said flange extending outwardly from said threaded portion of said outer bushing wall.

15. The apparatus of claim 11 wherein said cap is provided with a plurality of cap passages.

16. The apparatus of claim 11 wherein said cap passages have a central axis which extends across a central axis of said nipple at an angle of less than 90°.

17. A method of changing the rate of flow of gas into a fluidized bed comprising:
    providing fluidized bed apparatus comprising a fluidized chamber having a grid plate below said chamber, a feed gas channel opening below said grid plate, and a fluidized bed gas distributor,
    said fluidized bed gas distributor comprising
    a nipple,
    a cap,
    and a first bushing, wherein said cap is provided with at least one gas distribution passage, and said nipple includes a central nipple passage and said bushing includes a central first bushing passage,
    said cap being attached to a first end of said nipple said bushing being attached to a second end of said nipple
    said nipple being cylindrical said central nipple passage being cylindrical,
    said bushing being cylindrical said central first bushing passage being cylindrical, said central nipple passage and said central first bushing passage being connected in fluid flow communication, the diameter of said central first bushing passage being smaller than the diameter of said central nipple passage, whereby the flow of fluid into said central nipple passage is restricted by said smaller diameter of said central first bushing passage,
    said first bushing being adapted to be readily separable from said nipple from below said grid plate said nipple being attached to said grid plate,
    passing gas through said first bushing central passage, through said central nipple passage and through said cap gas distribution passage into said fluidized chamber,
    replacing said first bushing with a second bushing have a central second bushing passage, said central second passage having an effectively different diameter than said central first bushing passage,
    passing gas through said second bushing central passage, through said central nipple passage and through said cap gas distribution passage into said fluidized chamber, whereby the rate of gas flow into the fluidized bed is changed.

* * * * *